United States Patent
Anderson et al.

(10) Patent No.: US 7,601,314 B2
(45) Date of Patent: Oct. 13, 2009

(54) REDUCTIVE AMMONIACAL LEACHING OF NICKEL AND COBALT BEARING MATERIALS

(75) Inventors: Peter Allan Anderson, Pimlico (AU); Mark Fisher, Brisbane (AU); John Ernest Fittock, Annandale (AU); Victoria Margaret Hultgren, Bushland Beach (AU); Erin Maree Jones, South Brisbane (AU); Robert Bruce Messenger, Kirwan (AU); Adam Sean Moroney, Stockton (AU)

(73) Assignee: BHP Billiton SSM Technology Pty Ltd, Brisbane, Queensland (AU)

( * ) Notice: Subject to any disclaimer, the term of this patent is extended or adjusted under 35 U.S.C. 154(b) by 447 days.

(21) Appl. No.: 10/553,032

(22) PCT Filed: Apr. 8, 2004

(86) PCT No.: PCT/AU2004/000475

§ 371 (c)(1),
(2), (4) Date: Jun. 12, 2006

(87) PCT Pub. No.: WO2004/090176

PCT Pub. Date: Oct. 21, 2004

(65) Prior Publication Data

US 2007/0166214 A1    Jul. 19, 2007

(30) Foreign Application Priority Data

Apr. 11, 2003    (AU) .............................. 2003901727

(51) Int. Cl.
*C01G 1/00* (2006.01)
*B01D 11/00* (2006.01)

(52) U.S. Cl. .................. 423/138; 423/140; 423/141; 423/142; 423/143; 423/150.1; 423/150.3; 423/150.4

(58) Field of Classification Search .................. None
See application file for complete search history.

(56) References Cited

U.S. PATENT DOCUMENTS 3,888,966 A    6/1975    Miller (Continued)

FOREIGN PATENT DOCUMENTS

CA    618826    4/1961

(Continued)

OTHER PUBLICATIONS

Taylor, Alan, "Nickel laterites processing", Feb. 1996, pp. 100-103, vol. 174, No. 2, Mining Magazine, Mining Journal Ltd., London, Great Britain.

(Continued)

*Primary Examiner*—Melvin C Mayes
*Assistant Examiner*—Sarah Van Oudenaren
(74) *Attorney, Agent, or Firm*—B. Aaron Schulman; Stites & Harbison (57) ABSTRACT

A process for the recovery of nickel and/or cobalt from an impure nickel, cobalt or mixed nickel/cobalt material including the steps of: a) providing a nickel, cobalt or mixed nickel/cobalt material; and b) contacting the nickel, cobalt or mixed nickel/cobalt material with a feed ammoniacal ammonium carbonate solution and a reductant in a leach step.

22 Claims, 2 Drawing Sheets

Typical Single stage Reductive
LeachProcess applied to Caron type plant

U.S. PATENT DOCUMENTS

| | | | |
|---|---|---|---|
| 4,085,188 | A | 4/1978 | Subramanian et al. |
| 4,322,390 | A | 3/1982 | Tolley et al. |
| 4,927,794 | A | 5/1990 | Marcantonio |
| 6,264,904 | B1 | 7/2001 | Freeman |
| 6,267,800 | B1 | 7/2001 | Freeman |
| 6,383,460 | B2 | 5/2002 | Jones |
| 2006/0263282 | A1* | 11/2006 | Francis et al. ............... 423/139 |

FOREIGN PATENT DOCUMENTS

| | | |
|---|---|---|
| CA | 2256560 | 8/1998 |
| EP | 00651062 | 12/1998 |

OTHER PUBLICATIONS

Derwent Accession No. 94-222418/27, JP 06158186 (Mitsubishi Materials Corp.) Jun. 7, 1994 & abstract.

Derwent Accession No. 94-174076/21, JP 0611662 A (Mitsubishi Materials Corp) Apr. 26, 1994 & abstract.

* cited by examiner

Fig 1 Typical Single stage Reductive Leach Process applied to Caron type plant

Fig 2 Typical Two stage Reductive Leach Process Applied to Caron Type process

REDUCTIVE AMMONIACAL LEACHING OF NICKEL AND COBALT BEARING MATERIALS

The invention provides an improved method of dissolution of nickel and cobalt materials in ammoniacal leaching systems by the addition of reducing agents. More specifically, it describes an enhanced method of leaching a nickel, cobalt or mixed nickel/cobalt materials in ammonia-ammonium carbonate solutions with the addition of a cobalt sulphide, mixed cobalt/nickel sulphide or hydroxylamine as a reductant. Preferably, this process is applied to the recovery of nickel and cobalt from a mixed nickel/cobalt hydroxide material.

BACKGROUND OF THE INVENTION

Mixed impure nickel/cobalt carbonates, basic carbonates, basic sulphates or hydroxides are often produced as intermediate products, as a step in the extraction of nickel and cobalt from their ores. These intermediates are then leached, selectively where possible to minimize impurities, and the resulting solutions treated in a variety of separation processes to produce refined nickel and refined cobalt. Leaching in ammoniacal solutions is well known and is in use commercially.

A process of treating a mixed nickel/cobalt hydroxide precipitate produced from pressure acid leaching of laterite ore is described by Simmons et al. in Canadian Patent no. 618826, where the mixed hydroxide precipitate can be releached in ammonium hydroxide, ammonium carbonate or ammonium sulphate alone or in combination.

The process developed for the Cawse Nickel project in Western Australia, was described in a paper presented at Nickel/Cobalt 97, Canada. The paper describes the process to extract nickel and cobalt from laterite ore by pressure acid leaching and describes the redissolution of the nickel and cobalt hydroxides produced as an intermediate by subjecting them to an ammonia leach, which it describes as "proven technology".

The use of ammoniacal solutions for releaching the mixed nickel/cobalt hydroxide has the advantage that it is selective in preferentially extracting nickel and cobalt, leaving behind impurities such as iron, manganese, and magnesium. However it has the disadvantage that it does not extract all the nickel and cobalt from the hydroxides, leaving behind a residue that is rich in the two metals.

This does not constitute a major problem on a plant site where the ore is processed completely through to the final nickel and cobalt refined products in one location, as the nickel and cobalt rich residue from the releach step can be recycled to the initial ore treatment step to recover most of the metal values. An example of this has been used in commercial operation in Australia, where the high nickel and cobalt content residue from an inefficient leach of a mixed nickel/cobalt hydroxide in an ammonia ammonium carbonate solution was recycled to the primary ore leach stage to achieve an acceptable metal recovery efficiency.

However, mixed impure nickel/cobalt hydroxides, carbonates, basic carbonates or basic sulphates may be shipped as concentrated intermediates for processing at another site, without facilities for recycling the residue. The mixed nickel and cobalt hydroxides also exhibit a tendency to "age" subsequent to initial precipitation during the storage and transport process by processes associated with oxidation or recrystallisation, increasing the difficulty of dissolution, and increasing the amount of nickel and cobalt remaining in the leach residue. The incomplete dissolution of nickel and cobalt in the ammoniacal solution in these situations then necessitates a further expensive treatment step, or results in a loss of valuable product.

The use of reductants to enhance metal recovery in ammoniacal leaching systems is reported in the literature and various schemes have been proposed to recover metal values (principally nickel, cobalt and copper) from manganese oxide ocean nodules.

Steemson in a paper presented at the Alta Nickel/Cobalt Pressure Leaching and Hydrometallurgy Forum (1999) in Perth described the application of reductive leaching, using sulphur dioxide, for the recovery of nickel and cobalt from a mixed hydroxide in an ammonia/ammonium sulphate medium, as part of the Ramu project. In this process again, any unleached residue could be recycled to the ore leach stage for nickel and cobalt recovery.

The prior art processes do not provide for a complete and economical recovery of nickel and cobalt from a nickel, cobalt, or mixed nickel/cobalt hydroxide, carbonate, basic carbonate or basic sulphate material.

Furthermore the inventors have identified two different aging mechanisms operating when in particular, crude mixed nickel/cobalt hydroxides are stored for extended periods. The first aging process is oxidative and primarily affects cobalt redissolution and is largely overcome by the use of a reductant in the ammoniacal leach liquor. The second "aging" mechanism affects the nickel and appears to be associated with co-precipitation and/or recrystallisation processes within the solid.

An improvement on the prior art would therefore be to achieve a more complete dissolution and hence recovery of nickel and cobalt from a nickel, cobalt, or nickel/cobalt hydroxide, carbonate, basic carbonate, or basic sulphate material during the leaching process in an ammoniacal ammonium carbonate solution, overcoming any aging effects of the material, while minimizing releaching of impurities, and minimizing reagent costs. It is a desired feature of the present invention to provide a process that achieves improvements in the recovery of nickel and/or cobalt from nickel, cobalt, or mixed nickel/cobalt hydroxide, carbonate, basic carbonate or basic sulphate material.

The discussion of the background to the invention herein is included to explain the context of the invention. This is not to be taken as an admission that any of the material referred to was published, known or part of the common general knowledge in Australia as at the priority date of any of the claims.

Throughout the description and claims of the specification the word "comprise" and variations of the word, such as "comprising" and "comprises", is not intended to exclude other additives, components, integers or steps.

DETAILED DESCRIPTION OF THE INVENTION

The present invention resides in a method of leaching nickel and cobalt from a nickel, cobalt or a mixed nickel/cobalt material in an ammoniacal ammonium carbonate solution together with a reductant. The reductant is preferably selected from hydroxylamine, a mixed cobalt/nickel sulphide, or cobalt sulphide.

The nickel, cobalt or mixed nickel/cobalt material in the process will generally be an intermediate product produced in a nickel and cobalt recovery process. Whereas the process of the invention has been described with reference to the recovery of nickel and/or cobalt from a nickel, cobalt or a mixed nickel/cobalt material, the process is particularly applicable to the recovery of nickel and cobalt from a mixed nickel/ cobalt hydroxide material, but may vary, depending on the availability of the starting material.

In one embodiment, the present invention resides in a process for the recovery of nickel and/or cobalt from a mixed nickel/cobalt material including the steps of:

a) providing a mixed nickel, cobalt, or nickel/cobalt material; and b) contacting the nickel, cobalt or mixed nickel/cobalt material with an ammoniacal ammonium carbonate solution and a reductant in a nickel and/or cobalt leach step.

The nickel, cobalt or mixed nickel/cobalt material is preferably selected from a nickel, cobalt or a mixed nickel/cobalt hydroxide, carbonate, basic carbonate or basic sulphate material. Most preferably, the mixed nickel/cobalt material is a mixed nickel/cobalt hydroxide material.

This preferred embodiment generally consists of contacting the hydroxide material with an ammoniacal ammonium carbonate solution and a reductant. The reaction mixture is preferably agitated and heated to a temperature of between 30 to 90° C. and takes place at atmospheric pressure or at elevated pressure. Preferably after an initial anaerobic period of at least 10 minutes, air or an oxygen containing gas is injected into the mixture.

The mixture is agitated for a residence time of between 30 minutes and twelve hours, preferably from about 1 hour to 6 hours. The air or oxygen containing gas may be injected after an anaerobic agitation period of from 10 minutes to 4 hours.

Following agitation, the residue (containing undissolved nickel, cobalt, magnesium and manganese hydroxides) is separated from the nickel/cobalt ammine solution (the product solution).

The feed ammoniacal ammonium carbonate solution preferably comprises from about 8 to 16% by wt ammonia and about 4 to 12% by wt carbon dioxide. This leach solution may also include low levels of dissolved nickel and cobalt, for example, 0.5 to 1.5% by weight nickel and 0.02 to 0.2% by weight cobalt. Preferably, the feed ammoniacal ammonium carbonate leach solution used is the process liquor of a nickel and cobalt solution produced by a Caron process plant, or modified Caron type process plant, where a reduced nickel laterite ore is leached in an ammoniacal ammonium carbonate solution. If such an ammoniacal ammonium carbonate solution is used, the ammoniacal ammonium carbonate leach solution will contain some nickel and/or cobalt in solution.

The preferred reductant is a mixed cobalt/nickel sulphide. As an alternative embodiment of the invention, the mixed cobalt/nickel sulphide is produced as part of the reaction process. In this embodiment, a nickel/cobalt containing ammoniacal ammonium carbonate solution is treated with ammonium hydrosulphide or sodium hydrosulphide to produce a solid precipitate of mixed cobalt/nickel sulphide. The nickel/cobalt containing ammoniacal ammonium carbonate solution may be the process liquor from a Caron type process (that is the process liquor from leaching a reduced laterite ore with an ammoniacal ammonium carbonate solution) or a portion of any nickel/cobalt containing process liquor, for example, the overflow from a tailings wash thickener which will contain liquor and cobalt.

The precipitated mixed cobalt/nickel sulphide is then used as the reductant together with the feed ammoniacal ammonium carbonate leach solution to leach the nickel, cobalt or mixed nickel/cobalt material in accordance with the process of the present invention.

Alternatively, cobalt sulphide may be produced rather than a mixed cobalt/nickel sulphide, depending on the nickel and cobalt concentrations in the nickel/cobalt containing ammoniacal ammonium carbonate solution. The nickel and/or cobalt in the cobalt/nickel sulphide (or cobalt sulphide) may also be leached together with the nickel and cobalt present in the material during the leaching step.

The process may include further leach steps to improve the recovery of the nickel and cobalt, wherein at least one leach step is conducted with a combination of an ammoniacal ammonium carbonate solution and a reductant.

Accordingly, in a further embodiment, the present invention resides in a process for the recovery of nickel and/or cobalt from a nickel, cobalt or a mixed nickel/cobalt material including the steps of:

a) providing a nickel, cobalt or a mixed nickel/cobalt material;

b) contacting the nickel, cobalt or mixed nickel/cobalt material with a feed ammoniacal ammonium carbonate solution in a primary leach step;

c) separating the residue of the primary leach step from the product solution; and d) contacting the residue with fresh ammoniacal ammonium carbonate solution and a reductant in a secondary leach step.

The nickel, cobalt or mixed nickel/cobalt material is preferably selected from a nickel, cobalt or a mixed nickel/cobalt hydroxide, carbonate, basic carbonate or basic sulphate material. Most preferably, the mixed nickel/cobalt material is a mixed nickel/cobalt hydroxide material.

The residue of the primary leach step will contain some nickel and cobalt. In order to achieve an improvement in the nickel and/or cobalt recovery in this two stage leach process, the residue from the primary leach step is releached in a secondary leach step, this time with the addition of a reductant to the leach slurry. The residue of the secondary leach step is then separated from the secondary product solution. The dissolved nickel and cobalt may be recovered from the secondary product solution at this stage, or preferably the secondary product solution is returned and combined with the feed ammoniacal ammonium carbonate solution for the primary leach step. The enriched product solution following this secondary leach step is then sent for processing to separate and recover the nickel and cobalt. The residue may be returned to the ore roasting and leaching stage of the plant, or discarded.

Alternatively, in yet a further embodiment, the residue may be subjected to a post reductive third leach step whereby the residue from the secondary leach step is subjected to prolonged contact with a strong ammoniacal ammonium carbonate solution. Preferably the ammoniacal ammonium carbonate solution contains 8 to 16 wt % ammonia, 4 to 12 wt % carbon dioxide, 0 to 1.0 wt % nickel, and 0 to 0.1 wt % cobalt.

It has been found that better recovery of nickel and cobalt can be achieved by subjecting the residue of the secondary (or reductive) leach step to prolonged contact with a strong ammoniacal ammonium carbonate solution. The preferred steps in the two (or alternatively three) stage leach process are as follows:

1. Contacting the nickel, cobalt, or mixed nickel/cobalt hydroxide, carbonate, basic carbonate, or basic sulphate material with a feed ammoniacal ammonium carbonate solution in a primary leach step. The feed ammoniacal ammonium carbonate solution may contain nickel and cobalt from previous leaching operations for example, the product liquor of a Caron process in the leaching of laterite ores. The feed ammoniacal ammonium carbonate solution preferably includes 8 to 16 wt % ammonia, 4 to 12 wt % carbon dioxide, 0.5 to 1.5 wt % nickel and 0.02 to 0.2 wt % cobalt. The mixture is then agitated preferably for a period of from 30 minutes to 12 hours and treated at a temperature of about 30° to 90° C. at atmospheric pressure or elevated pressure. Air or an oxygen containing gas may be injected during this primary leach step;

2. Separating the residue (containing undisolved nickel, cobalt, magnesium and manganese oxides and/or hydroxides) from the nickel/cobalt ammine product solution;

3. Contacting the residue from the primary leach step with fresh ammoniacal ammonium carbonate solution and a reductant in a secondary or reductive leach step. The fresh ammoniacal ammonium carbonate solution may advantageously contain relatively low concentrations of dissolved nickel and cobalt, and a relatively high concentration of free ammonia. Ammoniacal ammonium carbonate leach solution that has not been used in the leaching of laterite ore may be used in this step, so there is generally less nickel and cobalt present in this fresh ammoniacal ammonium carbonate solution than in the primary leach step. It has been found that this is beneficial to more efficient leaching of nickel and cobalt. The fresh ammoniacal ammonium carbonate solution preferably contains 8 to 16% by weight ammonia and 4 to 12% by weight carbon dioxide with only trace amounts of nickel and cobalt.

4. The mixture is then agitated and if a sulphide reductant is being used, after an initial anaerobic period of at least 10 minutes and up to 4 hours, the mixture is then agitated with air or an oxygen containing gas injection. The total agitation period being for a similar length of time and under similar conditions as in the primary leach step; and 5. Separating the residue from the secondary leach from the resultant product solution and then returning the product solution to the primary leach stage by mixing the product solution with the feed ammoniacal ammonium carbonate leach solution. The residue from the secondary leach step is optionally subjected to prolonged contact with strong ammoniacal ammonium carbonate liquor to further enhance the recovery of nickel and cobalt. The residue following this prolonged contact with the strong ammoniacal ammonium carbonate solution is separated and discarded while the enriched product solution is sent for further processing to separate the cobalt and the nickel.

It is possible, depending on the degree of "aging" and composition of the nickel, cobalt or nickel/cobalt feed material, that the residue from the secondary leach stage will be small in mass and have little or no nickel and cobalt content and will not require a third leach stage. In this case the preferred leach process would have two leach stages, the second stage in the presence of the reductant.

A preferred embodiment of the process of the invention regardless of the number of leach steps, is the use of a mixed cobalt/nickel sulphide or cobalt sulphide as the reductant. Most preferably, a mixed cobalt/nickel sulphide is used as the reductant. A mixed cobalt/nickel sulphide has the advantage that it can be produced simply from nickel/cobalt containing ammoniacal ammonium carbonate solutions by the addition of ammonium hydrosulphide or sodium hydrosulphide. The composition of cobalt sulphide or a mixed cobalt/nickel sulphide depends on the nickel and/or cobalt concentrations in the nickel/cobalt containing ammoniacal ammonium carbonate leach solutions and the temperature, method and addition ratio of the sulphiding agent.

The nickel/cobalt containing ammoniacal ammonium carbonate solution may be a portion of the feed ammoniacal ammonium carbonate solution and may be the process liquor of a Caron type process. As an alternative, a portion of the selected nickel/cobalt containing process liquor, such as the product solution from the leaching process, or the overflow from a tailings wash thickener, may be used for the preparation of the mixed cobalt/nickel sulphide reductant in this manner.

Mixed cobalt/nickel sulphide is also significantly cheaper than hydroxylammine to use as a reductant and minimizes the introduction of additional chemicals to the leach process.

Typically, the process of the present invention is useful in the nickel and cobalt recovery process where it is necessary to recover nickel and cobalt from reduced laterite ore by leaching in ammoniacal ammonium carbonate solution, such as in the Caron process or a modified Caron process. It is contemplated that the process of the present invention may be integrated into such a process, where the metal values from a nickel, cobalt or mixed nickel/cobalt intermediate products are to be recovered into the process.

The process of the present invention is also useful in the nickel and cobalt recovery process where it is necessary to recover nickel and cobalt from laterite ore using an acid leach process. It is contemplated that the process of the present invention may be integrated into such a process, where nickel and cobalt are recovered from the acid leach product liquor as a mixed nickel/cobalt hydroxide product and redissolved in ammoniacal ammonium carbonate solutions. In such a process, the improved recovery of metal values using the present invention will minimize the recycling of nickel and cobalt to the ore treatment section, reducing processing cost and improving operational efficiencies.

The process of the present invention, which preferably includes either a primary, secondary or tertiary stage reductive leach to dissolve a nickel, cobalt, or mixed nickel/cobalt hydroxide, carbonate, basic carbonate, or basic sulphate precipitate in ammoniacal ammonium carbonate solutions, using hydroxylamine or a mixed cobalt/nickel sulphide as the reductant, has several advantages over the conventional oxidative leach process for the recovery of nickel and cobalt.

A particular advantage is that the recovery into solution of nickel and cobalt is significantly higher using the reductive leach process. This is particularly important where the nickel and/or cobalt containing material is to be processed in a location remote from the original ore processing step, where the leach residue containing unrecovered nickel and cobalt therefore can not be reprocessed with the ore feed. It is also useful where the nickel and/or cobalt containing material is to be processed in situ, as the reductive leach minimizes the quantity of residue which may be recycled to ore processing, hence minimizing process inefficiencies and costs.

A further advantage is that the mixed cobalt/nickel sulphide used as the reductant is particularly easy to produce in the process, and is amenable to re absorption into the process, as it contains the two metals which are to be recovered. This is particularly useful where the process receiving the mixed hydroxide is the Caron ammoniacal ammonium carbonate process, where a mixed cobalt/nickel sulphide is easily produced, typically by the addition of ammonium hydrosulphide or sodium hydrosulphide to any of the process streams containing nickel and cobalt.

A further advantage is that the dissolution process eliminates the impurities such as manganese, magnesium, and iron that may be present in the nickel and/or cobalt containing intermediate, as they are eliminated from the enriched product liquor solution.

A further advantage, which is particularly useful in the Caron process, is that the production of the mixed cobalt/nickel sulphide reductant by treatment of a process stream from the ammoniacal ammonium carbonate leach circuit with ammonium hydrosulphide, has the effect of depleting the cobalt content of the process stream, which improves the leaching of cobalt in the ore leach stage, and increases the overall cobalt recovery of the process.

A further advantage, which is particularly useful in the Caron process, is that the physical properties of the residue produced from a reductive leach are better than those of the residue produced from a non reductive leach, in that the reductive leach residue has improved settling and filtration characteristics, which allows more efficient and economic separation of the residue from the leach product solution.

The invention will now be described with reference to the accompanying drawings and Examples. The drawings and Examples are illustrative of preferred embodiments of the invention, and the scope of the invention is not to be considered limited thereto.

DETAILED DESCRIPTION OF THE ATTACHED DRAWINGS

A nickel and cobalt recovery process integrating the process of the present invention is described by reference to FIG. 1, which is a flowsheet of the single stage leach and FIG. 2 which is a flowsheet describing the two and three stage leach. Both flowsheets describe the use of a mixed cobalt/nickel sulphide as a reductant in the leaching process.

Figure 1:
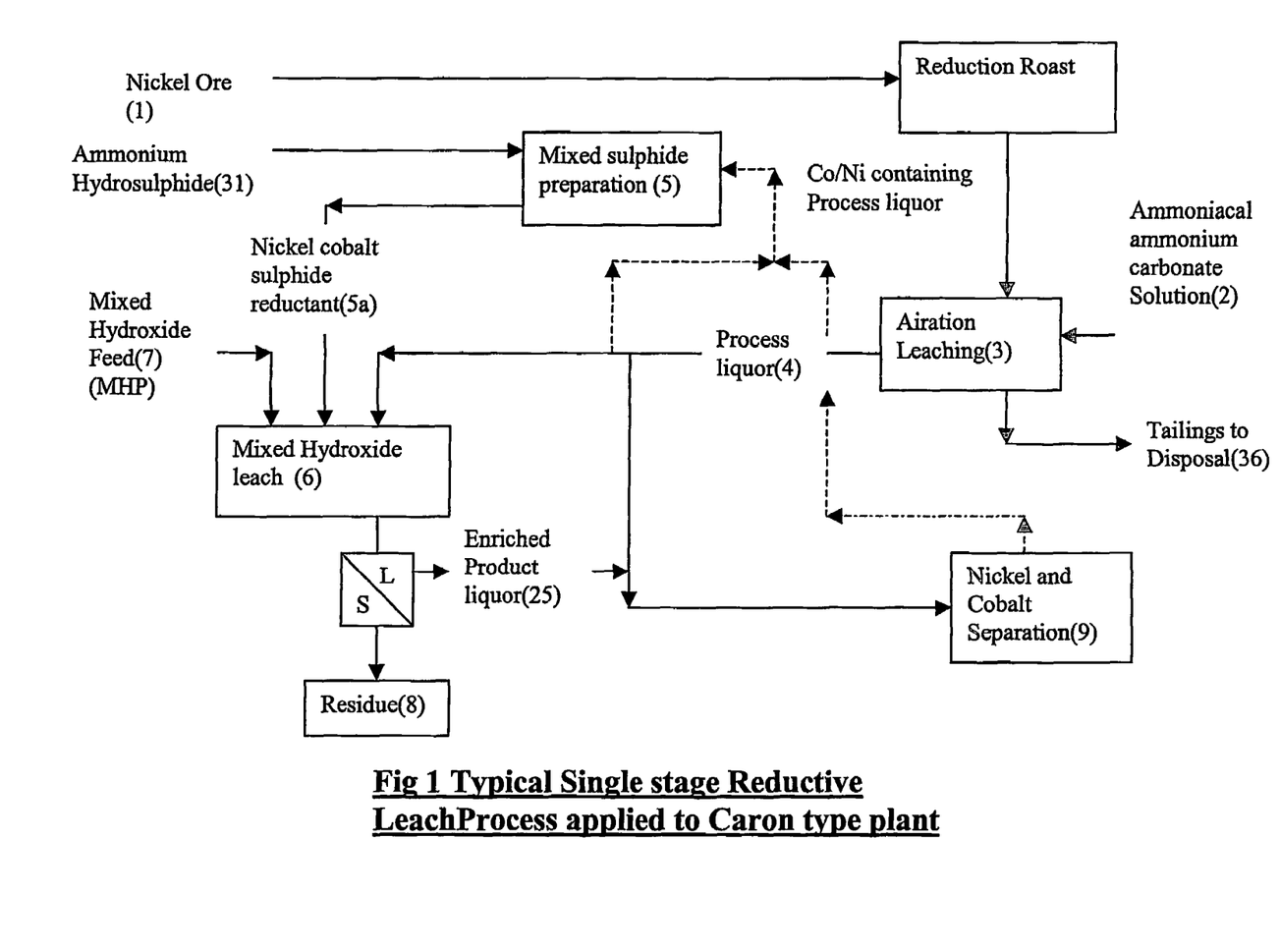

The process described in FIG. 1 illustrates the application of the single stage reductive leach to the Caron process. Operations 1 to 4 indicate an abbreviated form of the Caron process. Laterite nickel ore (1) is reduced and then leached by an ammoniacal ammonium carbonate leach solution (2) in the aeration leach plant to produce an ore tailings (36) and a process liquor (4). The ammoniacal ammonium carbonate solution may be the process liquor from a Caron type process and as such contains some nickel and cobalt. The process liquor (4) is the feed ammoniacal ammonium carbonate leach solution of the process of the present invention. The feed ammoniacal ammonium carbonate leach solution contains typically 8-16% ammonia, 4-12% carbon dioxide, 0.5-1.5% nickel and 0.02-0.2% cobalt.

A portion of the ammoniacal ammonium carbonate leach solution containing some nickel and cobalt, is treated with ammonium hydrosulphide (31) (or sodium hydrosulphide) to produce a solid precipitate of mixed cobalt/nickel sulphide (5). This is transferred as a mixed cobalt/nickel sulphide reductant slurry (5a) and added, together with mixed nickel/cobalt hydroxide feed (7), and the feed ammoniacal ammonium carbonate leach solution, (being the process liquor (4)). Optionally a nickel, cobalt or mixed nickel/cobalt carbonate, basic carbonate or basic sulphate material could be used instead of the mixed nickel cobalt hydroxide. The mixture is agitated, for a residence time of between thirty minutes and twelve hours at a temperature of about 30° C. to 90° C. at atmospheric or elevated pressure. Optionally, air or an oxygen containing gas is injected into the mixture after a period of at least 10 minutes anaerobic agitation. Preferably, between about 30 minutes and 4 hours anaerobic agitation occurs.

The nickel and cobalt from both the mixed hydroxide and the added mixed sulphide reductant are leached into the product solution, together with some minor impurities in the form of manganese, magnesium and iron from the mixed hydroxide. The enriched product liquor (25) is separated from the residue (8) and added to the remaining process liquor which proceeds for further processing (9) to separate the nickel and cobalt and extract them separately from solution.

The enriched product liquor may have a nickel content of between 1 gram per litre and 30 gram per litre, depending on the nature of the downstream processing required.

The leach residue (8) is rejected or recycled to the ore treatment section where it is possible to do so.

Figure 2:
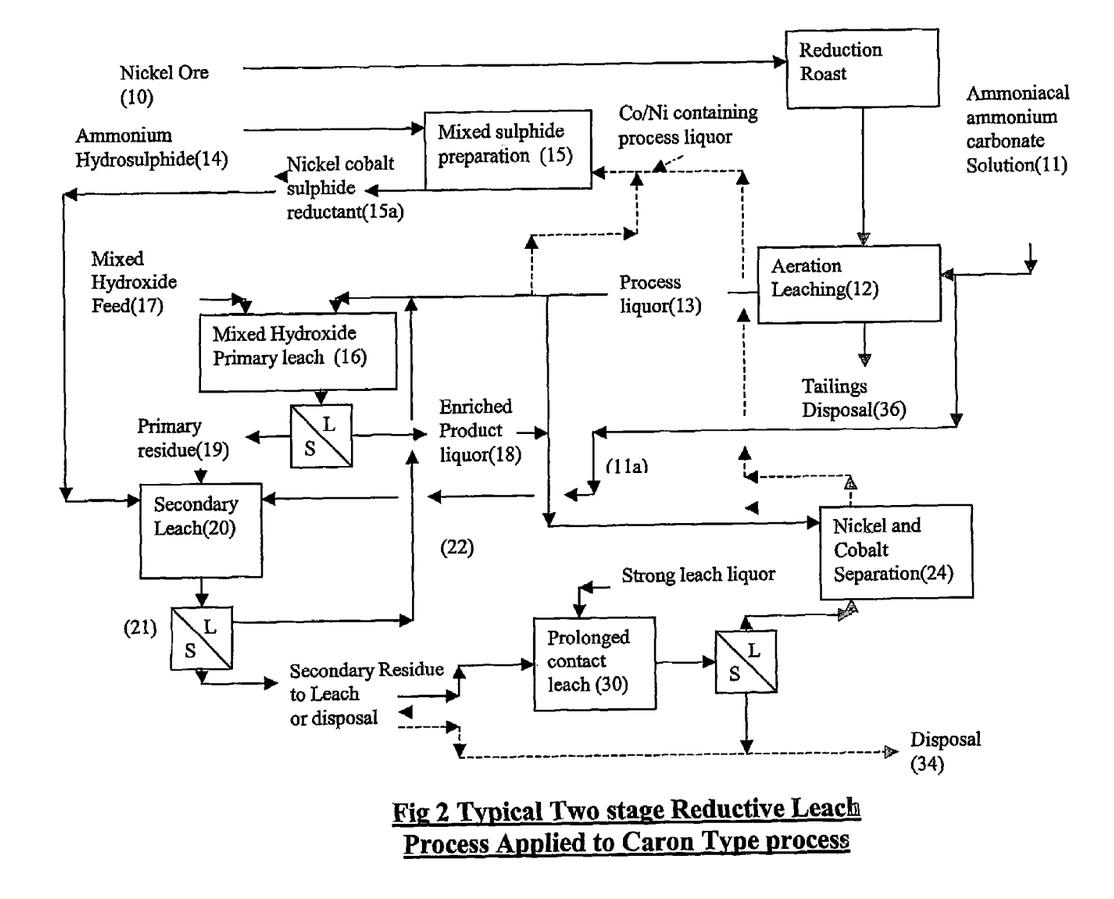

The process described in FIG. 2 illustrates the application of the two or three stage reductive leach to the Caron process. In this process the major part of the nickel and cobalt present in the mixed nickel/cobalt hydroxide (or alternatively, nickel, cobalt or mixed nickel/cobalt carbonate, basic carbonate or basic sulphate material) is dissolved in a primary leach stage, leaving a smaller quantity of material for the secondary leach stage, which then requires a smaller quantity of the mixed sulphide reductant while still allowing a higher ratio of reductant to the residue metals to be dissolved. The fresh ammoniacal ammonium carbonate solution used in the second stage leach also contains relatively low concentrations of nickel and cobalt, further improving the dissolution process for the metals.

Laterite nickel ore (10) is reduced and then leached by an ammoniacal ammonium carbonate solution (11) in the aeration leach plant to produce an ore tailings for disposal (36) and a process liquor solution (13). The ammoniacal ammonium carbonate solution (11) may be the product liquor from a Caron type process and as such contains some nickel and cobalt. The process liquor (13) is the feed ammoniacal ammonium carbonate solution of the process of the present invention. The feed ammoniacal ammonium carbonate solution contains typically 8-16% ammonia, 4-12% carbon dioxide, 0-1.5% Nickel and 0-0.2% cobalt, preferably 0-1.0% nickel and 0.01% cobalt.

The mixed nickel/cobalt hydroxide feed (17), is added to a mixture of the process liquor (13) and the secondary leach product liquor (22) (when available) and agitated together in the primary leach stage (16) for a residence time of between thirty minutes and twelve hours to obtain maximum dissolution of the nickel and cobalt values. Air or an oxygen containing gas may be injected during the primary leach stage.

The residue from the primary leach stage (19) is separated from the enriched product liquor (18) and passes to the secondary leach stage (20).

A portion of the process liquor solution (13), being a nickel/cobalt containing ammonia ammonium carbonate solution, is treated with ammonium hydrosulphide (or sodium hydrosulphide) (14) to produce a solid precipitate of mixed cobalt/nickel sulphide (15). Alternatively, the nickel/cobalt containing ammonia ammonium carbonate solution may be a portion of any selected cobalt/nickel containing process liquor such as the nickel/cobalt product liquor for separation (24), or overflow from a tailings wash thickener. This is transferred as a mixed nickel/cobalt sulphide reductant (15a) to the secondary leach stage where it is mixed with the primary leach residue (19) and fresh ammoniacal ammonium carbonate solution (11a). This fresh ammoniacal ammonium carbonate leach solution contains only trace values of nickel and cobalt, as it generally has not been used in the Caron type ore leaching step, which assists, together with the presence of the reductant, to obtain maximum dissolution of both nickel and cobalt. The secondary leaching stage comprises an initial anaerobic phase, of at least 10 minutes, and optionally followed by aeration of the mixture with air or an oxygen containing gas, with a total residence time of thirty minutes to twelve hours. The remaining nickel and cobalt values are efficiently extracted in the secondary leach into the secondary leach product solution (22), which is separated from the secondary leach residue (21) and returned to the primary leach.

The enriched product liquor (18) from the primary leach and the enriched product solution (22) from the secondary leach, are added to the remaining product liquor (13) which proceeds for further processing (24) to separate the nickel and cobalt and extract them separately from solution.

The enriched product liquor may have a nickel content of between 1 gram per litre and 30 gram per litre, depending on the nature of the downstream processing required.

The secondary leach residue is either returned to the roasting and leaching stage of the plant, rejected or forwarded to the third leach stage as required. In the third leach stage, the residue is subjected to prolonged contact with a strong ammoniacal ammonium carbonate leach solution (30) to recover further nickel and cobalt in a product liquor. The resultant solution is separated and proceeds for further processing (24) to recover the nickel and cobalt. The residue will generally be sent for disposal (34).

EXAMPLES

The following examples demonstrate the effectiveness of the invention.

Example 1

Tests have been conducted with hydroxylamine sulphate which is commonly used as a reductant, to illustrate the concept of reductive leaching in ammoniacal solutions.

Table 1 shows the dissolution from a commercially produced mixed nickel/cobalt hydroxide, in an ammoniacal ammonium carbonate solution, with and without hydroxylamine sulphate addition.

TABLE 1

Effect of Hydroxylamine Addition on Hydroxide Leaching

| Solids Composition | Feed Mixed Hydroxide | Hydroxylamine Leach Residue | Control Leach Residue with no reductant |
|---|---|---|---|
| % Ni | 37.2 | 2.2 | 10.3 |
| % Co | 3.8 | 0.46 | 2.9 |
| % Mn | 6.8 | 35.5 | 35.5 |
| Ni dissolution (%) | | 99 | 96 |
| Co dissolution (%) | | 98 | 90 |

Lixivant composition: 93 g/L $NH_3$, 68 g/L $CO_2$
Leach temperature: 30° C.
Leach time: 45 minutes
Solids: equivalent to 10 g dry hydroxide (4 g (Ni + Co)/500 mL lixivant
Hydroxylamine dosage: 4.50 g of $(NH_2OH)_2 \cdot H_2SO_4$/test Table 2 shows the dissolution from a mixed nickel cobalt hydroxide leach residue, after two prior stages of leaching in ammoniacal ammonium carbonate liquors.

TABLE 2

Effect of Hydroxylamine addition on Releach of Hydroxide Leach Residue

| | Feed | After two initial leaches | After reductive releach | After control releach with no reductant |
|---|---|---|---|---|
| Lixiviant | | Caron product liquor, followed by ore leach solution | Caron Ore leach solution | Caron Ore leach solution |
| Leach Time (min) | | | 180 | 180 |
| Leach Temp (° C.) | | | 90 | 90 |
| Solids Composition | | | | |
| % Ni | 45.4 | 7.32 | 3.74 | 5.38 |
| % Co | 1.62 | 0.97 | 0.54 | 0.77 |
| % Mn | 3.14 | 12.9 | 13.0 | 13.7 |
| % Mg | 3.00 | 13.9 | 13.9 | 14.1 |
| Incremental Dissolution | | | | |
| Ni (%) | | 95.6 | 50.9 | 35.4 |
| Co (%) | | 82.4 | 46.0 | 27.8 |
| Mn (%) | | 6.7 | 0.3 | 0.1 |
| Cumulative Dissolution | | | | |
| Ni (%) | | 95.6 | 97.8 | 97.2 |
| Co (%) | | 82.4 | 90.5 | 87.3 |
| Mn (%) | | 6.7 | 7.0 | 6.8 |

Lixivant composition: 155 g/L $NH_3$, 105 g/L $CO_2$
Leach time: 180 minutes
Solids: 10% w/w (122 g residue (dry basis)/test
Hydroxylamine dosage: 56.2 g of $(NH_2OH)_2 \cdot H_2SO_4$/test Table 1 demonstrates that the addition of hydroxylamine improved the nickel and cobalt dissolution from the mixed hydroxide. Table 2 demonstrates the applicability of the reductant addition to releaching of mixed hydroxide leach residues. This offers an alternative to reprocessing of leach residues via the normal ore processing route.

Results from leaching testwork without reductant on the commercial sample indicated that the dissolution of cobalt from the mixed hydroxide declined with age of the hydroxide, in agreement with leachability tests on other hydroxides (known as the aging effect). Addition of reductant (hydroxylamine sulphate) to the leach test overcame the aging effect.

Example 2

In the following example, a mixed cobalt nickel sulphide was produced by treating a typical 'Caron' process product liquor with ammonium hydrosulphide for the leaching of either mixed nickel/cobalt hydroxide in a single stage leach, or the residue from a previous ammoniacal ammonium carbonate leach of mixed hydroxide precipitate (MHP) in the two stage leach.

Three cases have been tested:

1) a single stage leach in product Liquor with sulphide as a reductant, 2) primary leach in Product Liquor (without sulphide as a reductant, and no aeration), followed by a secondary leach of the first stage residue with the mixed sulphide as a reductant, or 3) a tertiary leach/prolonged contact in strong ammoniacal ammonium carbonate solution.

In either the single stage leach with sulphide (case 1), or the two stage leach with sulphide (case 2), the sulphide leach consisted of a 30 minute anaerobic leach, followed by an aerobic leach (the latter achieved by oxygen sparging at 0.25 vv oxygen at atmospheric pressure for 120 minutes, or pressurizing with oxygen to 500 kPag for 30 minutes in a laboratory autoclave). The initial mixed hydroxide was from the commercial supply, and 6-8 months old at the time of testing.

Results are shown in Tables 3 and 4.

TABLE 3

Single Stage Leaching of Mixed hydroxide Precipitate(MHP) with Mixed Sulphide reductant

| | Pressure | | | |
|---|---|---|---|---|
| | Oxygen (atmospheric) | | 500 kPag Oxygen | |
| Test | No reductant | Reductant | No reductant | Reductant |
| Mixed sulphide (% w/w) (see note a. below) | 0 | 0.12 | 0 | 0.12 |
| Mixed hydroxide (% w/w) | 2.9 | 2.9 | 2.6 | 2.8 |
| Lixiviant-Caron product liquor/ore leach solution | | | | |
| Anaerobic Leach (min) | 30 | 30 | 30 | 30 |
| Aerobic Leach (min) | 120 | 120 | 30 | 30 |
| Leach Temperature (° C.) | 65 | 65 | 80 | 80 |
| Solids | Initial MHP | Primary Residue | Primary Residue | Primary Residue | Primary Residue |
| Ni (%) | 38.8 | 8.19 | 2.49 | 8.23 | 2.12 |
| Co (%) | 4.10 | 3.07 | 1.10 | 2.73 | 1.52 |
| Mn (%) | 6.91 | 32.30 | 32.08 | 30.27 | 32.5 |
| Total Dissolution (from MHP and sulphide reductant) | | | | | |
| Ni (%) | | 95.1 | 98.6 | 95.8 | 98.8 |
| Co (%) | | 82.9 | 95.4 | 87.1 | 92.6 |
| Dissolution from MHP | | | | | |
| Ni (%) | | 95.1 | 98.5 | 95.8 | 98.8 |
| Co (%) | | 82.9 | 94.1 | 87.1 | 90.6 | a. Reductant solids composition 17% Ni, 29% Co, 29% S.

TABLE 4

Second Stage Reductive Leaching of Primary Leach Residue with Mixed Sulphide

| | Pressure | | | |
|---|---|---|---|---|
| | O₂ (atmospheric) | | 500 kPag O₂ | |
| Test | Control-no reductant | Reductant | Control-no reductant | Reductant |
| Mixed sulphide (% w/w) | 0 | 0.44 | 0 | 0.44 |
| Mixed Hydroxide (% w/w) | 2.1 | 2.0 | 2.1 | 2.0 |
| Lixiviant | Caron Product liquor | Ore leach solution | Ore leach solution | Ore leach solution | Ore leach solution |
| Anaerobic Leach (min) | | 30 | 30 | 30 | 30 |
| Aerobic Leach (min) | | 120 | 120 | 30 | 30 |
| Leach Temperature (° C.) | | 65 | 65 | 80 | 80 |
| Solids | Initial MHP Primary Residue | Secondary Residue | Secondary Residue | Secondary Residue | Secondary Residue |
| Ni (%) | 8.56 | 7.37 | 1.92 | 6.48 | 1.44 |
| Co (%) | 2.70 | 2.17 | 1.02 | 2.29 | 0.62 |
| Mn (%) | 30.34 | 29.70 | 31.77 | 30.82 | 31.35 |
| Total Dissolution (from mixed hydroxide 1ˢᵗ stage residue and reductant) | | | | | |
| Ni (%) | | 95.5 | −5.7 | 80.0 | 16.3 | 86.9 |
| Co (%) | | 86.7 | −9.6 | 85.8 | 6.3 | 92.4 |
| Dissolution from Mixed Hydroxide First stage Residue | | | | | |
| Ni (%) | | | −5.7 | 72.0 | 16.3 | 81.5 |
| Co (%) | | | −9.6 | 54.6 | 6.3 | 75.7 |
| Cumulative Dissolution from original Mixed hydroxide feed | | | | | |
| Ni (%) | | 95.5 | 98.7 | 96.2 | 99.2 |
| Co (%) | | 86.7 | 94.0 | 87.5 | 96.8 |

The results in Tables 3 and 4 indicate that the dissolution from either mixed hydroxide or primary leach residue was improved by the addition of sulphide. Moreover, it was demonstrated that the high total recoveries from the hydroxide (98-99% for Ni and 94% or better for Co) could be obtained by the use of a reductant.

The result in Table 5 shows the affect of the tertiary leach having strong ammoniacal ammonium carbonate liquor to treat the residue from the two stage reductive leach.

TABLE 5

| | Cumulative % Recovery | |
|---|---|---|
| Solids | Ni | Co |
| Secondary residue | 97.8 | 95.2 |
| Tertiary residue | 99.0 | 97.6 |

Example 3

In a further example, the residue from the primary ammoniacal ammonium carbonate pilot plant leach of a mixed nickel cobalt hydroxide intermediate was subjected to a secondary reduction leach test, using cobalt nickel sulphide reductants produced from Caron process ammoniacal ammonium carbonate nickel/cobalt solutions by different techniques.

The secondary leach tests were carried out at 55° C., and consisted of a 30 minutes anaerobic leach following reductant addition, followed by aerobic sparging for 240 minutes.

The mixed hydroxide intermediate analyzed Ni 35%, Co 3.67%, and Mn 6.47%. The primary leach residue used in the tests analyzed Ni 9.59%, Co 2.49%, and Mn 24.6%.

The results of these tests demonstrate that mixed cobalt nickel sulphide reductants of similar effectiveness, and with a range of cobalt/nickel ratios can be produced using ammoniacal ammonium carbonate nickel and cobalt solutions from different points in the Caron process to suit the process economics. These results are indicated in Table 6.

TABLE 6

| Reductant type | Reductant Analysis | | | | Extraction from Mixed Hydroxide Precipitate | |
|---|---|---|---|---|---|---|
| | Ni % | Co % | S % | Co/Ni | Ni % | Co % |
| No reductant | | | | | 92.3 | 83.3 |
| CoNi Sulphide 1. | 12.8 | 33 | 31 | 2.58 | 98.2 | 97.7 |
| CoNi Sulphide 2. | 7.6 | 31.5 | 42 | 4.14 | 96 | 91.8 |
| CoNi Sulphide 3. | 7.32 | 28.5 | 28.8 | 3.89 | 95.2 | 89.8 |

Example 4

In a further example, a mixed hydroxide precipitate was leached in a continuous pilot plant in a three stage leach, using a cobalt nickel reductant produced from a Caron process solution. The results, indicated in table 7, demonstrate that the reductive leach process is successful in continuous operation

TABLE 7

| Leach Stage | % Extraction from Mixed Hydroxide Precipitate | |
|---|---|---|
| | Ni (average) | Co (average) |
| Primary Leach | 93.4 | 88.4 |
| Secondary Leach | 99.4 | 93.7 |
| Tertiary leach | 99.7 | 94.7 |

Notes to table 7
1. Sulphide reductant analysed Ni 11.3%, Co 24.3%, S 26.6%, Co/Ni 2.15. It was produced at 43° C., at 2.25 mol sulphide per mol Cobalt in feed solution.
2. Average CoNiS reductant dose was 5.6 mol sulphide/mol Cobalt in Primary leach underflow
3. Average feed MHP composition was 46.1% Ni, 1.78% Co, 2.85% Mn, 1.80% Mg, 4.13% S The above description is intended to be illustrative of the preferred embodiments of the present invention. It should be understood by those skilled in the art that many variations or alterations may be made without departing from the spirit of the invention, and such variations or alterations are to be considered a part of the invention described herein.

The invention claimed is:

1. A process for the recovery of nickel and/or cobalt from an impure nickel, cobalt or mixed nickel/cobalt material including the steps of:
a) providing a nickel, cobalt or mixed nickel/cobalt material; and
b) contacting the nickel, cobalt or mixed nickel/cobalt material with a feed ammoniacal ammonium carbonate solution and a reductant in a leach step, wherein the reductant is selected from a mixed cobalt/nickel sulphide, cobalt sulphide or hydroxylamine.

2. A process according to claim 1, wherein the nickel, cobalt or mixed nickel/cobalt material is either a nickel, cobalt or mixed nickel/cobalt hydroxide, carbonate, basic carbonate or basic sulphate material.

3. A process according to claim 1, wherein the nickel, cobalt or mixed nickel/cobalt material is a mixed nickel/cobalt hydroxide material.

4. A process according to claim 1, wherein the feed ammoniacal ammonium carbonate solution is a process liquor from a Caron process.

5. A process according to claim 1, wherein the reductant is a mixed cobalt/nickel sulphide and is produced by contacting a cobalt/nickel containing ammoniacal ammonium carbonate solution with ammonium hydrosulphide or sodium hydrosulphide, to precipitate a mixed cobalt/nickel sulphide.

6. A process according to claim 5, wherein the cobalt/nickel containing ammoniacal ammonium carbonate solution is a portion of the process liquor of a Caron process used as the feed ammoniacal ammonium carbonate solution, or a portion of any selected cobalt/nickel containing process liquor.

7. A process according to claim 1 wherein the feed ammoniacal ammonium carbonate solution and the cobalt/nickel containing ammoniacal ammonium carbonate solution contain 8 to 16% by wt ammonia, 4 to 12% by wt carbon dioxide, 0.5 to 1.5% by wt nickel and 0.02 to 0.2% by wt cobalt.

8. A process according to claim 1 wherein the mixture of the nickel, cobalt or mixed nickel/cobalt material, the feed ammoniacal ammonium carbonate solution and reductant is agitated for a period of from 30 minutes to 12 hours at a temperature of from 30 to 90° C. at atmospheric or elevated pressure.

9. A process according to claim 8 wherein air or oxygen containing gas is injected into the mixture after a period of at least 10 minutes anaerobic agitation.

10. A process according to claim 1, wherein the leach step includes:
a) a primary leach step wherein the nickel, cobalt or mixed nickel/cobalt material is contacted with a feed ammoniacal ammonium carbonate solution to produce a product solution and a residue;
b) separating the residue from the product solution; and
c) a secondary leach step wherein the residue is contacted with fresh ammoniacal ammonium carbonate solution and a reductant to produce a secondary product solution containing dissolved nickel and cobalt and a secondary leach residue;
wherein the reductant is selected from a mixed nickel/cobalt hydroxide, cobalt sulphide or hydroxylamine.

11. A process according to claim 10, wherein the nickel, cobalt or mixed nickel/cobalt material is either a nickel, cobalt or mixed nickel/cobalt hydroxide, carbonate, basic carbonate or basic sulphate material.

12. A process according to claim 10, wherein the material is a mixed nickel/cobalt hydroxide material.

13. A process according to claim 10 wherein the feed ammoniacal ammonium carbonate solution is a process liquor from a Caron process.

14. A process according to claim 10 wherein the secondary product solution is returned and combined with the feed ammoniacal ammonium carbonate solution for the primary leach step.

15. A process according to claim 10 including the further step wherein the secondary leach residue is subjected to a third leach step by subjecting the secondary leach residue to prolonged contact with a strong ammoniacal ammonium carbonate solution.

16. A process according to claim 15, the strong ammoniacal ammonium carbonate solution contains 8 to 16 wt % ammonia, 4 to 12 wt % carbon dioxide, 0 to 1.0 wt % nickel, and 0 to 0.1 wt % cobalt.

17. A process according to claim 10 wherein the reductant is a mixed cobalt/nickel sulphide and is produced by contacting a cobalt/nickel containing ammoniacal ammonium carbonate solution with ammonium hydrosulphide or sodium hydrosulphide to precipitate a mixed cobalt/nickel sulphide.

18. A process according to claim 17, wherein the cobalt/nickel containing ammoniacal ammonium carbonate solution is a portion of the process liquor of a Caron process used as the feed ammoniacal ammonium carbonate solution, or a portion of any selected cobalt/nickel containing process liquor.

19. A process according to claim 10 wherein the feed ammoniacal ammonium carbonate solution and the cobalt/nickel containing ammoniacal ammonium carbonate solution contains 8 to 16% by wt ammonia, 4 to 12% by wt carbon dioxide, 0.5 to 1.5% by wt nickel and 0.02 to 0.2% by wt cobalt.

20. A process according to claim 10 wherein the fresh ammoniacal ammonium carbonate leach solution for the secondary leach step contains from 8 to 16% by wt ammonia and 4 to 12% by wt carbon dioxide with only trace amounts of nickel and cobalt.

21. A process according to claim 10 wherein the mixture of the fresh ammoniacal ammonium carbonate leach solution, the residue of the primary leach step and the reductant is agitated for a period of from 30 minutes to 12 hours at a temperature of from 30 to 90° C. at atmospheric or elevated pressure.

22. A process according to claim 21 wherein air or oxygen containing gas is injected into the mixture after a period of at least 10 minutes anaerobic agitation.

* * * * *

UNITED STATES PATENT AND TRADEMARK OFFICE
CERTIFICATE OF CORRECTION

| | | |
|---|---|---|
| PATENT NO. | : 7,601,314 B2 | Page 1 of 1 |
| APPLICATION NO. | : 10/553032 | |
| DATED | : October 13, 2009 | |
| INVENTOR(S) | : Anderson et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 758 days.

Signed and Sealed this

Fifth Day of October, 2010

David J. Kappos
*Director of the United States Patent and Trademark Office*